(12) United States Patent
Tzannes

(10) Patent No.: US 8,718,158 B2
(45) Date of Patent: May 6, 2014

(54) SYSTEM AND METHOD FOR SCRAMBLING THE PHASE OF THE CARRIERS IN A MULTICARRIER COMMUNICATIONS SYSTEM

(75) Inventor: Marcos C. Tzannes, Orinda, CA (US)

(73) Assignee: TQ Delta, LLC, Austin, TX (US)

( * ) Notice: Subject to any disclaimer, the term of this patent is extended or adjusted under 35 U.S.C. 154(b) by 9 days.

(21) Appl. No.: 13/303,417

(22) Filed: Nov. 23, 2011

(65) Prior Publication Data

US 2012/0069878 A1    Mar. 22, 2012

Related U.S. Application Data

(63) Continuation of application No. 12/783,725, filed on May 20, 2010, now Pat. No. 8,090,008, which is a continuation of application No. 12/255,713, filed on Oct. 22, 2008, now Pat. No. 7,769,104, which is a continuation of application No. 11/863,581, filed on Sep. 28, 2007, now Pat. No. 7,471,721, which is a continuation of application No. 11/211,535, filed on Aug. 26, 2005, now Pat. No. 7,292,627, which is a continuation of application No. 09/710,310, filed on Nov. 9, 2000, now Pat. No. 6,961,369.

(60) Provisional application No. 60/164,134, filed on Nov. 9, 1999.

(51) Int. Cl.
*H04K 1/10*         (2006.01)
*H04L 27/28*        (2006.01)

(52) U.S. Cl.
USPC ........... 375/260; 375/222; 375/219; 375/220; 375/295; 375/316; 370/203; 370/527; 370/208

(58) Field of Classification Search
USPC ......... 375/222, 219, 220, 295, 316, 259, 260; 370/203, 527, 208
See application file for complete search history.

(56) References Cited

U.S. PATENT DOCUMENTS 3,898,566 A   8/1975   Switzer et al.
3,955,141 A   5/1976   Lyon et al.
(Continued)

FOREIGN PATENT DOCUMENTS

EP   0584534   3/1994
EP   0719004   6/1996
(Continued)

OTHER PUBLICATIONS

Invitation to Pay Additional Fees for International (PCT) Patent Application No. PCT/US00/30958, mailed Mar. 23, 2001.
(Continued)

*Primary Examiner* — Phuong Phu
(74) *Attorney, Agent, or Firm* — Jason H. Vick; Sheridan Ross, PC

(57) ABSTRACT

A system and method that scrambles the phase characteristic of a carrier signal are described. The scrambling of the phase characteristic of each carrier signal includes associating a value with each carrier signal and computing a phase shift for each carrier signal based on the value associated with that carrier signal. The value is determined independently of any input bit value carried by that carrier signal. The phase shift computed for each carrier signal is combined with the phase characteristic of that carrier signal so as to substantially scramble the phase characteristic of the carrier signals. Bits of an input signal are modulated onto the carrier signals having the substantially scrambled phase characteristic to produce a transmission signal with a reduced PAR.

30 Claims, 2 Drawing Sheets

(56) References Cited

U.S. PATENT DOCUMENTS

| | | | |
|---|---|---|---|
| 4,069,392 | A | 1/1978 | Goldenberg et al. |
| 4,358,853 | A | 11/1982 | Qureshi |
| 4,985,900 | A | 1/1991 | Rhind et al. |
| 5,381,449 | A | 1/1995 | Jasper et al. |
| 5,682,376 | A | 10/1997 | Hayashino et al. |
| 5,694,395 | A | 12/1997 | Myer et al. |
| 5,742,679 | A * | 4/1998 | Olafsson ............... 370/527 |
| 5,748,677 | A | 5/1998 | Kumar |
| 5,870,016 | A | 2/1999 | Shrestha |
| 5,903,614 | A | 5/1999 | Suzuki et al. |
| 5,914,932 | A | 6/1999 | Suzuki et al. |
| 5,937,010 | A | 8/1999 | Petranovich et al. |
| 5,991,262 | A | 11/1999 | Laird et al. |
| 6,128,350 | A | 10/2000 | Shastri et al. |
| 6,256,355 | B1 | 7/2001 | Sakoda et al. |
| 6,259,685 | B1 | 7/2001 | Rinne et al. |
| 6,366,555 | B1 | 4/2002 | Gatherer et al. |
| 6,507,585 | B1 | 1/2003 | Dobson |
| 6,519,292 | B1 | 2/2003 | Sakoda et al. |
| 6,590,860 | B1 | 7/2003 | Sakoda et al. |
| 6,704,317 | B1 | 3/2004 | Dobson |
| 6,757,299 | B1 | 6/2004 | Verma |
| 6,781,951 | B1 * | 8/2004 | Fifield ............... 370/203 |
| 6,961,369 | B1 | 11/2005 | Tzannes |
| 6,967,997 | B2 | 11/2005 | Humphrey |
| 7,257,168 | B2 | 8/2007 | Goldstein et al. |
| 7,286,614 | B2 | 10/2007 | Goldstein et al. |
| 7,292,627 | B2 | 11/2007 | Tzannes |
| 7,471,721 | B2 | 12/2008 | Tzannes |
| 7,610,028 | B2 | 10/2009 | Cimini, Jr. et al. |
| 7,769,104 | B2 | 8/2010 | Tzannes |
| 8,073,041 | B1 | 12/2011 | Tzannes |
| 2002/0172146 | A1 * | 11/2002 | Wu et al. ............... 370/208 |
| 2003/0128673 | A1 | 7/2003 | Lee et al. |
| 2005/0141410 | A1 | 6/2005 | Zhang et al. |
| 2006/0092902 | A1 | 5/2006 | Schmidt |
| 2006/0140288 | A1 | 6/2006 | Holden |
| 2010/0190507 | A1 | 7/2010 | Karabinis et al. |
| 2010/0290507 | A1 | 11/2010 | Tzannes |
| 2012/0195353 | A1 | 8/2012 | Tzannes |
| 2013/0136160 | A1 | 5/2013 | Tzannes |

FOREIGN PATENT DOCUMENTS

| | | |
|---|---|---|
| EP | 1542488 | 6/2005 |
| GB | 2330491 | 4/1999 |
| JP | H08-321820 | 12/1996 |
| JP | H10-084329 | 3/1998 |
| WO | WO 98/32065 | 7/1998 |
| WO | WO 99/22463 | 5/1999 |
| WO | WO 99/29078 | 6/1999 |

OTHER PUBLICATIONS

Invitation to Restrict or to Pay Additional Fees for International (PCT) Patent Application No. PCT/US00/30958, mailed Nov. 14, 2001.

Notice of Allowance for U.S. Appl. No. 13/284,549, mailed Mar. 20, 2012.

Notice of Allowance for U.S. Appl. No. 13/439,605, mailed Sep. 14, 2012.

U.S. Appl. No. 13/284,549, filed Oct. 28, 2011, Tzannes.

Bäuml et al., "Reducing the Peak-To-Average Power Ratio of Multicarrier Modulation by Selected Mapping," Electronics Letters, GB, IEE Stevenage, vol. 32(22), Oct. 24, 1996, pp. 2056-2057, XP000643915 ISSN: 0013-5194.

Henkel, "Analog Codes for Peak-to-Average Ratio Reduction," in Proceedings 3rd ITG Conf. Source and Channel Coding, Munich, Germany, Jan. 2000, 5 pages.

Narahashi et al., "New phasing scheme of N multiple carriers for reducing peak-to-average power ratio," Electronics Letters, Aug. 1994, vol. 30(17), pp. 1382-1383.

Tellado et al., "Revisiting DMT's Peak-to-Average Ratio," Antwerp, Apr. 20-24, 1998, pp. 1-14.

Tellambura, "A coding technique for reducing peak-to-average power ratio in OFDM," In the Proceedings of Global Telecommunications Conference, IEEE, Nov. 1998, pp. 2783-2787.

Tellambura, "Phase optimisation criterion for reducing peak-to-average power ratio in OFDM," Electronics Letters, Jan. 1998, vol. 34(2), pp. 169-170.

Van Eetvelt et al., "Peak to average power reduction for OFDM schemes by selective scrambling," Electronics Letters, Oct. 1996, vol. 32(21), pp. 1963-1964.

Annex to Form PCT/ISA/206 for PCT/US00/30958, Mar. 23, 2001, 3 pages (5550-47-PCT).

International Search Report for International (PCT) Patent Application No. PCT/US00/30958, mailed Jun. 12, 2001.

International Preliminary Examination Report for International (PCT) Patent Application No. PCT/US00/30958, completed Mar. 4, 2002.

Written Opinion for International (PCT) Patent Application No. PCT/US00/30958, mailed Dec. 18, 2001.

Notification of Reasons for Refusal (including translation) for Japanese Patent Application No. 2001-537217, date of dispatch, Mar. 3, 2008.

Decision of Refusal (including translation) for Japanese Patent Application No. 2001-537217, date of dispatch, Nov. 4, 2008.

Notice of Preliminary Rejection (translation only) for Korean Patent Application No. 7005830/2002 dated Nov. 22, 2006.

Office Action for U.S. Appl. No. 09/710,310, mailed May 4, 2004.

Notice of Allowance for U.S. Appl. No. 09/710,310, mailed Jul. 5, 2005.

Notice of Allowance for U.S. Appl. No. 11/211,535, mailed Sep. 6, 2007.

Notice of Allowance for U.S. Appl. No. 11/860,080, mailed Oct. 17, 2011.

Official Action for U.S. Appl. No. 11/863,581, mailed Feb. 6, 2008.

Notice of Allowance for U.S. Appl. No. 11/863,581, mailed Oct. 8, 2008.

Official Action for U.S. Appl. No. 12/255,713, mailed Oct. 15, 2009.

Notice of Allowance for U.S. Appl. No. 12/255,713, mailed May 18, 2010.

Notice of Allowance for U.S. Appl. No. 12/783,725, mailed Nov. 17, 2011.

Official Action for U.S. Appl. No. 13/718,016, mailed May 9, 2013.

Official Action for U.S. Appl. No. 13/718,016, mailed Feb. 4, 2014.

* cited by examiner

SYSTEM AND METHOD FOR SCRAMBLING THE PHASE OF THE CARRIERS IN A MULTICARRIER COMMUNICATIONS SYSTEM

RELATED APPLICATION

This application is a Continuation of U.S. patent application Ser. No. 12/783,725, filed May 20, 2010, now U.S. Pat. No. 8,090,008, which is a Continuation of U.S. patent application Ser. No. 12/255,713, filed Oct. 22, 2008, now U.S. Pat. No. 7,769,104, which is a Continuation of U.S. patent application Ser. No. 11/863,581, filed Sep. 28, 2007, now U.S. Pat. No. 7,471,721, which is a Continuation of U.S. application Ser. No. 11/211,535, filed Aug. 26, 2005, now U.S. Pat. No. 7,292,627, which is a Continuation of U.S. patent application Ser. No. 09/710,310, filed Nov. 9, 2000, now U.S. Pat. No. 6,961,369, which claims the benefit of the filing date of copending U.S. Provisional Application Ser. No. 60/164,134, filed Nov. 9, 1999, entitled "A Method For Randomizing The Phase Of The Carriers In A Multicarrier Communications System To Reduce The Peak To Average Power Ratio Of The Transmitted Signal," each of which are incorporated herein by reference in their entirety.

FIELD OF THE INVENTION

This invention relates to communications systems using multicarrier modulation. More particularly, the invention relates to multicarrier communications systems that lower the peak-to-average power ratio (PAR) of transmitted signals.

BACKGROUND OF THE INVENTION

In a conventional multicarrier communications system, transmitters communicate over a communication channel using multicarrier modulation or Discrete Multitone Modulation (DMT). Carrier signals (carriers) or sub-channels spaced within a usable frequency band of the communication channel are modulated at a symbol (i.e., block) transmission rate of the system. An input signal, which includes input data bits, is sent to a DMT transmitter, such as a DMT modem. The DMT transmitter typically modulates the phase characteristic, or phase, and amplitude of the carrier signals using an Inverse Fast Fourier Transform (IFFT) to generate a time domain signal, or transmission signal, that represents the input signal. The DMT transmitter transmits the transmission signal, which is a linear combination of the multiple carriers, to a DMT receiver over the communication channel.

The phase and amplitude of the carrier signals of DMT transmission signal can be considered random because the phase and amplitude result from the modulation of an arbitrary sequence of input data bits comprising the transmitted information. Therefore, under the condition that the modulated data bit stream is random, the DMT transmission signal can be approximated as having a Gaussian probability distribution. A bit scrambler is often used in the DMT transmitter to scramble the input data bits before the bits are modulated to assure that the transmitted data bits are random and, consequently, that the modulation of those bits produces a DMT transmission signal with a Gaussian probability distribution.

With an appropriate allocation of transmit power levels to the carriers or sub-channels, such a system provides a desirable performance. Further, generating a transmission signal with a Gaussian probability distribution is important in order to transmit a transmission signal with a low peak-to-average ratio (PAR), or peak-to-average power ratio. The PAR of a transmission signal is the ratio of the instantaneous peak value (i.e., maximum magnitude) of a signal parameter (e.g., voltage, current, phase, frequency, power) to the time-averaged value of the signal parameter. In DMT systems, the PAR of the transmitted signal is determined by the probability of the random transmission signal reaching a certain peak voltage during the time interval required for a certain number of symbols. An example of the PAR of a transmission signal transmitted from a DMT transmitter is 14.5 dB, which is equivalent to having a 1E-7 probability of clipping. The PAR of a transmission signal transmitted and received in a DMT communication system is an important consideration in the design of the DMT communication system because the PAR of a signal affects the communication system's total power consumption and component linearity requirements of the system.

If the phase of the modulated carriers is not random, then the PAR can increase greatly. Examples of cases where the phases of the modulated carrier signals are not random are when bit scramblers are not used, multiple carrier signals are used to modulate the same input data bits, and the constellation maps, which are mappings of input data bits to the phase of a carrier signal, used for modulation are not random enough (i.e., a zero value for a data bit corresponds to a 90 degree phase characteristic of the DMT carrier signal and a one value for a data bit corresponds to a –90 degree phase characteristic of the DMT carrier signal). An increased PAR can result in a system with high power consumption and/or with high probability of clipping the transmission signal. Thus, there remains a need for a system and method that can effectively scramble the phase of the modulated carrier signals in order to provide a low PAR for the transmission signal.

SUMMARY OF THE INVENTION

The present invention features a system and method that scrambles the phase characteristics of the modulated carrier signals in a transmission signal. In one aspect, a value is associated with each carrier signal. A phase shift is computed for each carrier signal based on the value associated with that carrier signal. The value is determined independently of any input bit value carried by that carrier signal. The phase shift computed for each carrier signal is combined with the phase characteristic of that carrier signal to substantially scramble the phase characteristics of the carrier signals.

In one embodiment, the input bit stream is modulated onto the carrier signals having the substantially scrambled phase characteristic to produce a transmission signal with a reduced peak-to-average power ratio (PAR). The value is derived from a predetermined parameter, such as a random number generator, a carrier number, a DMT symbol count, a superframe count, and a hyperframe count. In another embodiment, a predetermined transmission signal is transmitted when the amplitude of the transmission signal exceeds a certain level.

In another aspect, the invention features a method wherein a value is associated with each carrier signal. The value is determined independently of any input bit value carried by that carrier signal. A phase shift for each carrier signal is computed based on the value associated with that carrier signal. The transmission signal is demodulated using the phase shift computed for each carrier signal.

In another aspect, the invention features a system comprising a phase scrambler that computes a phase shift for each carrier signal based on a value associated with that carrier signal. The phase scrambler also combines the phase shift computed for each carrier signal with the phase characteristic of that carrier signal to substantially scramble the phase characteristic of the carrier signals. In one embodiment, a modulator, in communication with the phase scrambler, modulates bits of an input signal onto the carrier signals having the substantially scrambled phase characteristics to produce a transmission signal with a reduced PAR.

DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

Figure 1:
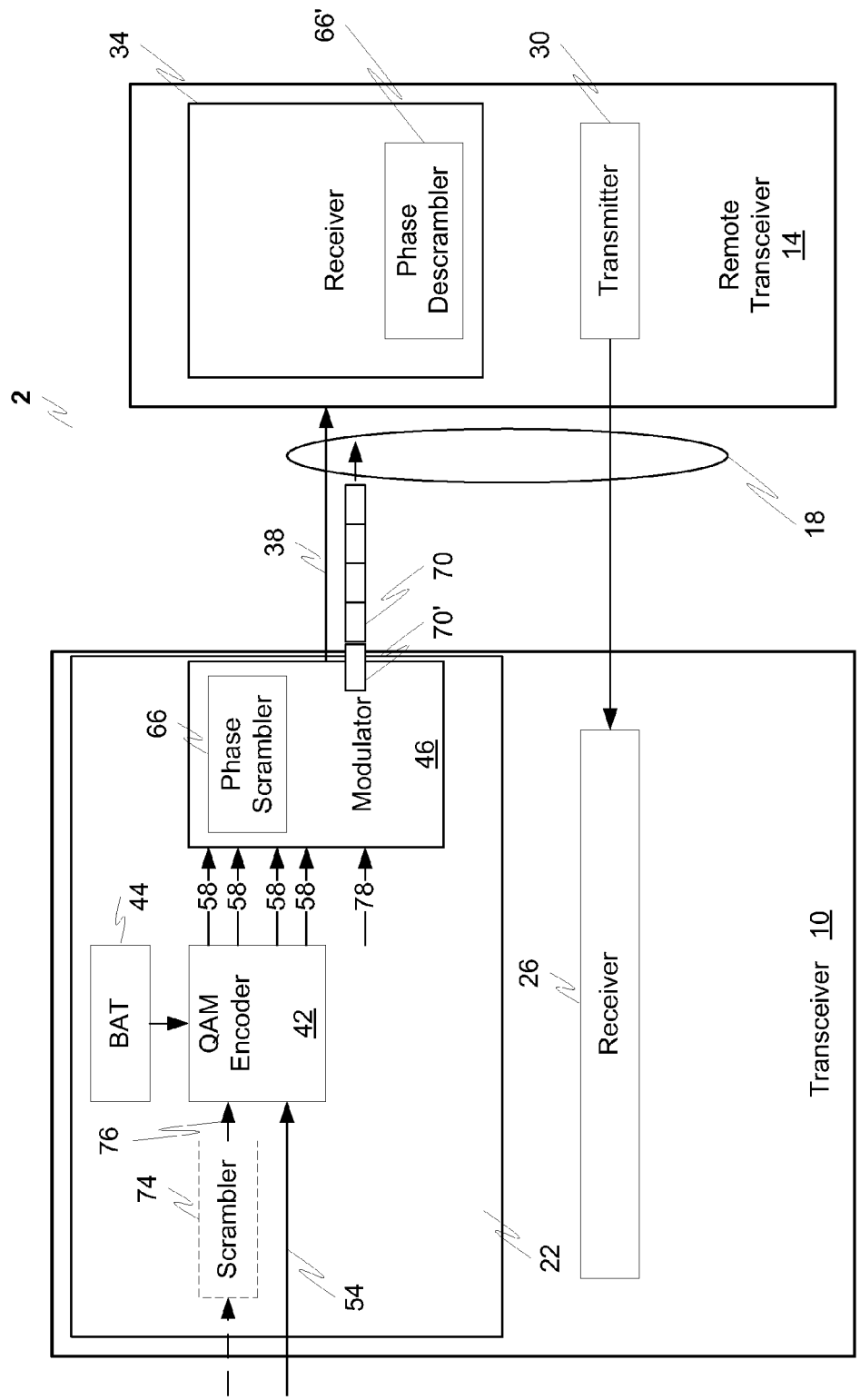
FIG. 1 is a block diagram of an embodiment of a digital subscriber line communications system including a DMT (discrete multitone modulation) transceiver, in communication with a remote transceiver, having a phase scrambler for substantially scrambling the phase characteristics of carrier signals.

FIG. 1 shows a digital subscriber line (DSL) communication system 2 including a discrete multitone (DMT) transceiver 10 in communication with a remote transceiver 14 over a communication channel 18 using a transmission signal 38 having a plurality of carrier signals. The DMT transceiver 10 includes a DMT transmitter 22 and a DMT receiver 26. The remote transceiver 14 includes a transmitter 30 and a receiver 34. Although described with respect to discrete multitone modulation, the principles of the invention apply also to other types of multicarrier modulation, such as, but not limited to, orthogonally multiplexed quadrature amplitude modulation (OQAM), discrete wavelet multitone (DWMT) modulation, and orthogonal frequency division multiplexing (OFDM).

The communication channel 18 provides a downstream transmission path from the DMT transmitter 22 to the remote receiver 34, and an upstream transmission path from the remote transmitter 30 to the DMT receiver 26. In one embodiment, the communication channel 18 is a pair of twisted wires of a telephone subscriber line. In other embodiments, the communication channel 18 can be a fiber optic wire, a quad cable, consisting of two pairs of twisted wires, or a quad cable that is one of a star quad cable, a Dieselhorst-Martin quad cable, and the like. In a wireless communication system wherein the transceivers 10, 14 are wireless modems, the communication channel 18 is the air through which the transmission signal 38 travels between the transceivers 10, 14.

By way of example, the DMT transmitter 22 shown in FIG. 1 includes a quadrature amplitude modulation (QAM) encoder 42, a modulator 46, a bit allocation table (BAT) 44, and a phase scrambler 66. The DMT transmitter 22 can also include a bit scrambler 74, as described further below. The remote transmitter 30 of the remote transceiver 14 comprises equivalent components as the DMT transmitter 22. Although this embodiment specifies a detailed description of the DMT transmitter 22, the inventive concepts apply also to the receivers 34, 24 which have similar components to that of the DMT transmitter 22, but perform inverse functions in a reverse order.

The QAM encoder 42 has a single input for receiving an input serial data bit stream 54 and multiple parallel outputs to transmit QAM symbols 58 generated by the QAM encoder 42 from the bit stream 54. In general, the QAM encoder 42 maps the input serial bit-stream 54 in the time domain into parallel QAM symbols 58 in the frequency domain. In particular, the QAM encoder 42 maps the input serial data bit stream 54 into N parallel quadrature amplitude modulation (QAM) constellation points 58, or QAM symbols 58, where N represents the number of carrier signals generated by the modulator 46. The BAT 44 is in communication with the QAM encoder 42 to specify the number of bits carried by each carrier signal. The QAM symbols 58 represent the amplitude and the phase characteristic of each carrier signal.

The modulator 46 provides functionality associated with the DMT modulation and transforms the QAM symbols 58 into DMT symbols 70 each comprised of a plurality of time-domain samples. The modulator 46 modulates each carrier signal with a different QAM symbol 58. As a result of this modulation, carrier signals have phase and amplitude characteristics based on the QAM symbol 58 and therefore based on the input-bit stream 54. In particular, the modulator 46 uses an inverse fast Fourier transform (IFFT) to change the QAM symbols 58 into a transmission signal 38 comprised of a sequence of DMT symbols 70. The modulator 46 changes the QAM symbols 58 into DMT symbols 70 through modulation of the carrier signals. In another embodiment, the modulator 46 uses the inverse discrete Fourier transform (IDFT) to change the QAM symbols 58 into DMT symbols 70. In one embodiment, a pilot tone is included in the transmission signal 38 to provide a reference signal for coherent demodulation of the carrier signals in the remote receiver 34 during reception of the transmission signal 38.

The modulator 46 also includes a phase scrambler 66 that combines a phase shift computed for each QAM-modulated carrier signal with the phase characteristic of that carrier signal. Combining phase shifts with phase characteristics, in accordance with the principles of the invention, substantially scrambles the phase characteristics of the carrier signals in the transmission signal 38. By scrambling the phase characteristics of the carrier signals, the resulting transmission signal 38 has a substantially minimized peak-to-average (PAR) power ratio. The phase scrambler 66 can be part of or external to the modulator 46. Other embodiments of the phase scrambler 66 include, but are not limited to, a software program that is stored in local memory and is executed on the modulator 46, a digital signal processor (DSP) capable of performing mathematical functions and algorithms, and the like. The remote receiver 34 similarly includes a phase descrambler 66' for use when demodulating carrier signals that have had their phase characteristics adjusted by the phase scrambler 66 of the DMT transceiver 10.

To compute a phase shift for each carrier signal, the phase scrambler 66 associates one or more values with that carrier signal. The phase scrambler 66 determines each value for a carrier signal independently of the QAM symbols 58, and, therefore, independently of the bit value(s) modulated onto the carrier signal. The actual value(s) that the phase scrambler 66 associates with each carrier signal can be derived from one or more predefined parameters, such as a pseudo-random number generator (pseudo-RNG), a DMT carrier number, a DMT symbol count, a DMT superframe count, a DMT hyperframe count, and the like, as described in more detail below. Irrespective of the technique used to produce each value, the same technique is used by the DMT transmitter 22 and the remote receiver 34 so that the value associated with a given carrier signal is known at both ends of the communication channel 18.

The phase scrambler 66 then solves a predetermined equation to compute a phase shift for the carrier signal, using the value(s) associated with that carrier signal as input that effects the output of the equation. Any equation suitable for computing phase shifts can be used to compute the phase shifts. When the equation is independent of the bit values of the input serial bit stream 54, the computed phase shifts are also independent of such bit values.

In one embodiment (shown in phantom), the DMT transmitter 22 includes a bit scrambler 74, which receives the input serial bit stream 54 and outputs data bits 76 that are substantially scrambled. The substantially scrambled bits 76 are then passed to the QAM encoder 42. When the bit scrambler 74 is included in the DMT transmitter 22, the operation of the phase scrambler 66 further assures that the transmission signal 38 has a Gaussian probability distribution and, therefore, a substantially minimized PAR.

Figure 2:
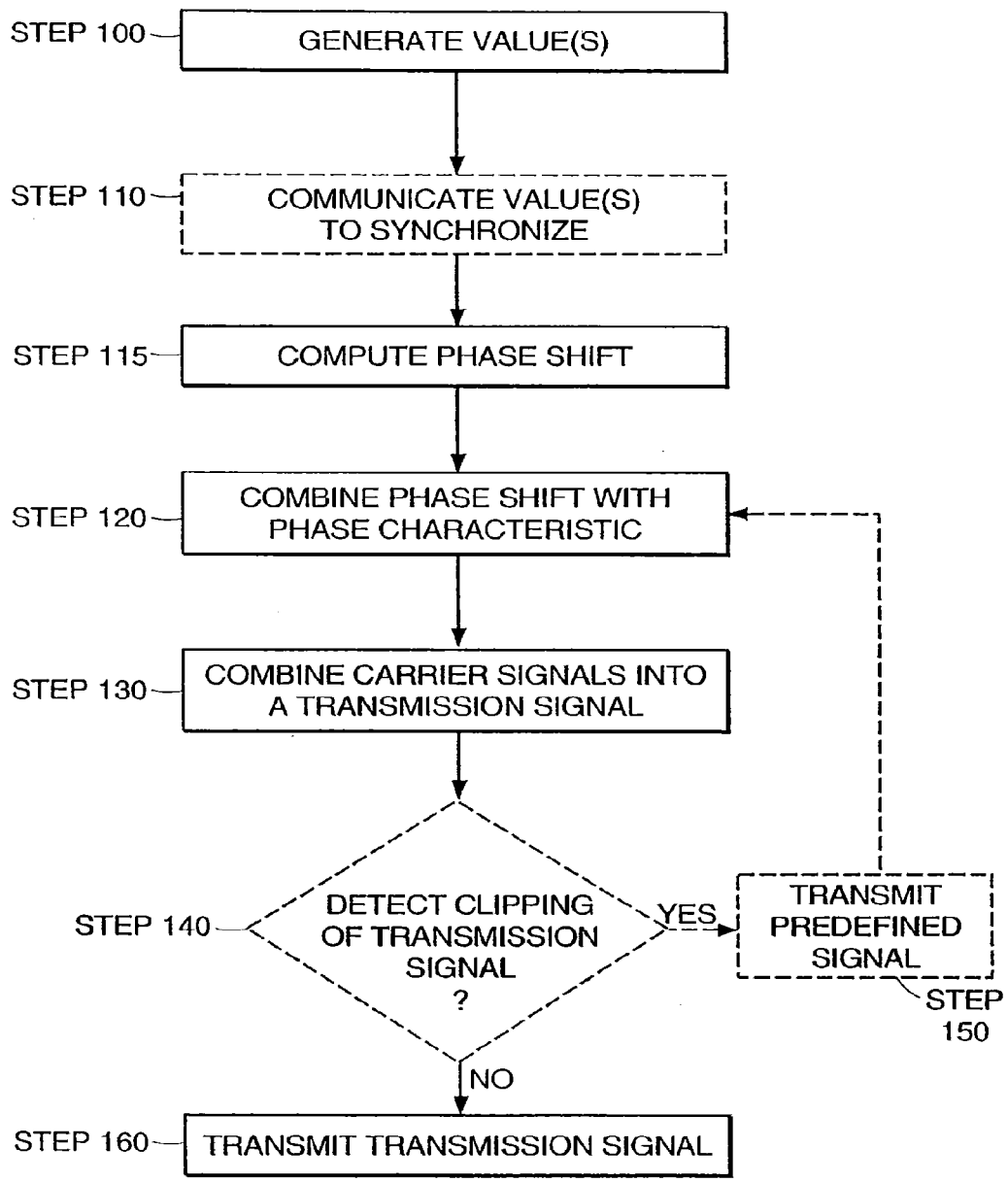
FIG. 2 is a flow diagram of an embodiment of a process for scrambling the phase characteristics of the carrier signals in a transmission signal.

FIG. 2 shows embodiments of a process used by the DMT transmitter 22 for adjusting the phase characteristic of each carrier signal and combining these carrier signals to produce the transmission signal 38. The DMT transmitter 22 generates (step 100) a value that is associated with a carrier signal. Because the value is being used to alter the phase characteristics of the carrier signal, both the DMT transmitter 22 and the remote receiver 34 must recognize the value as being associated with the carrier signal. Either the DMT transmitter 22 and the remote receiver 34 independently derive the associated value, or one informs the other of the associated value. For example, in one embodiment the DMT transmitter 22 can derive the value from a pseudo-RNG and then transmit the generated value to the remote receiver 34. In another embodiment, the remote receiver 34 similarly derives the value from the same pseudo-RNG and the same seed as used by the transmitter (i.e., the transmitter pseudo-RNG produces the same series of random numbers as the receiver pseudo-RNG).

As another example, the DMT transmitter 22 and the remote receiver 34 can each maintain a symbol counter for counting DMT symbols. The DMT transmitter 22 increments its symbol counter upon transmitting a DMT symbol; the remote receiver 34 upon receipt. Thus, when the DMT transmitter 22 and the remote receiver 34 both use the symbol count as a value for computing phase shifts, both the DMT transmitter 22 and remote receiver 34 "know" that the value is associated with a particular DMT symbol and with each carrier signal of that DMT symbol.

Values can also be derived from other types of predefined parameters. For example, if the predefined parameter is the DMT carrier number, then the value associated with a particular carrier signal is the carrier number of that signal within the DMT symbol. The number of a carrier signal represents the location of the frequency of the carrier signal relative to the frequency of other carrier signals within a DMT symbol. For example, in one embodiment the DSL communication system 2 provides 256 carrier signals, each separated by a frequency of 4.3125 kHz and spanning the frequency bandwidth from 0 kHz to 1104 kHz. The DMT transmitter 22 numbers the carrier signals from 0 to 255. Therefore, "DMT carrier number 50" represents the 51st DMT carrier signal which is located at the frequency of 215.625 kHz (i.e., 51×4.3125 kHz).

Again, the DMT transmitter 22 and the remote receiver 34 can know the value that is associated with the carrier signal because both the DMT transmitter 22 and the remote receiver 34 use the same predefined parameter (here, the DMT carrier number) to make the value-carrier signal association. In other embodiments (as exemplified above with the transmitter pseudo-RNG), the DMT transmitter 22 can transmit the value to the remote receiver 34 (or vice versa) over the communication channel 18.

In other embodiments, other predefined parameters can be used in conjunction with the symbol count. One example of such a predefined parameter is the superframe count that increments by one every 69 DMT symbols. One exemplary implementation that achieves the superframe counter is to perform a modulo 68 operation on the symbol count. As another example, the DMT transmitter 22 can maintain a hyperframe counter for counting hyperframes. An exemplary implementation of the hyperframe count is to perform a modulo 255 operation on the superframe count. Thus, the hyperframe count increments by one each time the superframe count reaches 255.

Accordingly, it is seen that some predefined parameters produce values that vary from carrier signal to carrier signal. For example, when the predefined parameter is the DMT carrier number, values vary based on the frequency of the carrier signal. As another example, the pseudo-RNG generates a new random value for each carrier signal.

Other predefined parameters produce values that vary from DMT symbol 70 to DMT symbol 70. For example, when the predefined parameter is the symbol count, the superframe count, or hyperframe count, values vary based on the numerical position of the DMT symbol 70 within a sequence of symbols, superframes, or hyperframes. Predefined parameters such as the pseudo-RNG, symbol count, superframe count, and superframe can also be understood to be parameters that vary values over time. Any one or combination of the predefined parameters can provide values for input to the equation that computes a phase shift for a given carrier signal.

In one embodiment, the phase scrambling is used to avoid clipping of the transmission signal 38 on a DMT symbol 70 by DMT symbol 70 basis. In this embodiment, the DMT transmitter 22 uses a value based on a predefined parameter that varies over time, such as the symbol count, to compute the phase shift. It is to be understood that other types of predefined parameters that vary the values associated with carrier signals can be used to practice the principles of the invention. As described above, the transceivers 10, 14 may communicate (step 110) the values to synchronize their use in modulating and demodulating the carrier signals.

The DMT transmitter 22 then computes (step 115) the phase shift that is used to adjust the phase characteristic of each carrier signal. The amount of the phase shift combined with the phase characteristic of each QAM-modulated carrier signal depends upon the equation used and the one or more values associated with that carrier signal.

The DMT transmitter 22 then combines (step 120) the phase shift computed for each carrier signal with the phase characteristic of that carrier signal. By scrambling the phase characteristics of the carrier signals, the phase scrambler 66 reduces (with respect to unscrambled phase characteristics) the combined PAR of the plurality of carrier signals and, consequently, the transmission signal 38. The following three phase shifting examples, PS #1-PS #3, illustrate methods used by the phase scrambler 66 to combine a computed phase shift to the phase characteristic of each carrier signal.

Phase Shifting Example #1

Phase shifting example #1 (PS #1) corresponds to adjusting the phase characteristic of the QAM-modulated carrier signal associated with a carrier number N by modulo (mod) $2\pi$. In this example, a carrier signal having a carrier number N equal to 50 has a phase shift added to the phase characteristic of that carrier signal equal to $$50 \times \frac{\pi}{3} (\text{mod} 2\pi) = \frac{2}{3}\pi.$$

The carrier signal with a carrier number N equal to 51 has a phase shift added to the phase characteristic of that carrier signal equal to $$51 \times \frac{\pi}{3} (\text{mod} 2\pi) = \pi.$$

The carrier signal with the carrier number N equal to 0 has no phase shift added to the phase characteristic of that carrier signal.

Phase Shifting Example #2

Phase shifting example #2 (PS #2) corresponds to adjusting the phase characteristic of the QAM-modulated carrier signal associated with a carrier number N by $$(N+M) \times \frac{\pi}{4},$$

mod $2\pi$, where M is the symbol count. In this example, a carrier signal having a carrier number N equal to 50 on DMT symbol count M equal to 8 has a phase shift added to the phase characteristic of that carrier signal equal to $$(50+8) \times \frac{\pi}{4} (\text{mod} 2\pi) = \frac{\pi}{2}.$$

The carrier signal with the same carrier number N equal to 50 on the next DMT symbol count M equal to 9 has a phase shift added to the phase characteristic of that carrier signal equal to $$(50+9) \times \frac{\pi}{4} (\text{mod} 2\pi) = \frac{3\pi}{4}.$$

Phase Shifting Example #3

Phase shifting example #3 (PS #3) corresponds to adjusting the phase characteristic of the QAM-modulated carrier signal associated with a carrier number N by $$(X_N) \times \frac{\pi}{6},$$

mod $2\pi$, where $X_N$ is an array of N pseudo-random numbers. In this example, a carrier signal having a carrier number N equal to 5 and $X_N$ equal to [3, 8, 1, 4, 9, 5, ...] has a phase shift added to the phase characteristic of the carrier signal that is equal to $$(9) \times \frac{\pi}{6} (\text{mod} 2\pi) = \frac{3\pi}{2} (\text{Note that 9 is the } 5^{th} \text{ value in } X_N.)$$

The carrier signal with a carrier number N equal to 6 has a phase shift added to the phase characteristic of the carrier signal equal to $$(5) \times \frac{\pi}{6} (\text{mod} 2\pi) = \frac{5\pi}{6}.$$

It is to be understood that additional and/or different phase shifting techniques can be used by the phase scrambler 66, and that PS #1, #2, and #3 are merely illustrative examples of the principles of the invention. The DMT transmitter 22 then combines (step 130) the carrier signals to form the transmission signal 38. If the transmission signal is not clipped, as described below, the DMT transmitter 22 consequently transmits (step 160) the transmission signal 38 to the remote receiver 34.

Clipping of Transmission Signals

A transmission signal 38 that has high peak values of voltage (i.e., a high PAR) can induce non-linear distortion in the DMT transmitter 22 and the communication channel 18. One form of this non-linear distortion of the transmission signal 38 that may occur is the limitation of the amplitude of the transmission signal 38 (i.e., clipping). For example, a particular DMT symbol 70 clips in the time domain when one or more time domain samples in that DMT symbol 70 are larger than the maximum allowed digital value for the DMT symbols 70. In multicarrier communication systems when clipping occurs, the transmission signal 38 does not accurately represent the input serial data bit signal 54.

In one embodiment, the DSL communication system 2 avoids the clipping of the transmission signal 38 on a DMT symbol 70 by DMT symbol 70 basis. The DMT transmitter 22 detects (step 140) the clipping of the transmission signal 38. If a particular DMT symbol 70 clips in the time domain to produce a clipped transmission signal 38, the DMT transmitter 22 substitutes (step 150) a predefined transmission signal 78 for the clipped transmission signal 38.

The predefined transmission signal 78 has the same duration as a DMT symbol 70 (e.g., 250 ms) in order to maintain symbol timing between the DMT transmitter 22 and the remote receiver 34. The predefined transmission signal 78 is not based on (i.e., independent of) the modulated input data bit stream 54; it is a bit value pattern that is recognized by the remote receiver 34 as a substituted signal. In one embodiment, the predefined transmission signal 78 is a known pseudo-random sequence pattern that is easily detected by the remote receiver 34. In another embodiment, the predefined transmission signal 78 is an "all zeros" signal, which is a zero voltage signal produced at the DMT transmitter 22 output (i.e., zero volts modulated on all the carrier signals). In addition to easy detection by the remote receiver 34, the zero voltage signal reduces the power consumption of the DMT transmitter 22 when delivered by the DMT transmitter 22. Further, a pilot tone is included in the predefined transmission signal 78 to provide a reference signal for coherent demodulation of the carrier signals in the remote receiver 34 during reception of the predefined transmission signal 78.

After the remote receiver 34 receives the transmission signal 38, the remote receiver 34 determines if the transmission signal 38 is equivalent to the predefined transmission signal 78. In one embodiment, when the remote receiver 34 identifies the predefined transmission signal 78, the remote receiver 34 ignores (i.e., discards) the predefined transmission signal 78.

Following the transmission of the predefined transmission signal 78, the phase scrambler 66 shifts (step 120) the phase characteristic of the QAM-modulated carrier signals (based on one of the predefined parameters that varies over time). For example, consider that a set of QAM symbols 58 produces a DMT symbol 70 comprising a plurality of time domain samples, and that one of the time domain samples is larger than the maximum allowed digital value for the DMT symbol 70. Therefore, because the transmission signal 38 would be clipped when sent to the remote receiver 34, the DMT transmitter 22 sends the predefined transmission signal 78 instead.

After transmission of the predefined transmission signal 78, the DMT transmitter 22 again attempts to send the same bit values that produced the clipped transmission signal 38 in a subsequent DMT symbol 70'. Because the generation of phase shifts in this embodiment is based on values that vary over time, the phase shifts computed for the subsequent DMT symbol 70' are different than those that were previously computed for the DMT symbol 70 with the clipped time domain sample. These different phase shifts are combined to the phase characteristics of the modulated carrier signals to produce carrier signals of the subsequent DMT symbol 70' with different phase characteristics than the carrier signals of the DMT symbol 70 with the clipped time domain sample.

DMT communication systems 2 infrequently produce transmission signals 38 that clip (e.g., approximately one clip every $10^7$ time domain samples 70). However, if the subsequent DMT symbol 70' includes a time domain sample that clips, then the predefined transmission signal 78 is again transmitted (step 150) to the remote receiver 34 instead of the clipped transmission signal 38. The clipping time domain sample may be on the same or on a different carrier signal than the previously clipped DMT symbol 70. The DMT transmitter 22 repeats the transmission of the predefined transmission signal 78 until the DMT transmitter 22 produces a subsequent DMT symbol 70' that is not clipped. When the DMT transmitter 22 produces a DMT symbol 70' that is not clipped, the DTM transmitter 22 transmits (step 160) the transmission signal 38 to the remote receiver 34. The probability of a DMT symbol 70 producing a transmission signal 38 that clips in the time domain depends on the PAR of the transmission signal 38.

For example, the following phase shifting example, PST #4, illustrates the method used by the phase scrambler 66 to combine a different phase shift to the phase characteristic of each carrier signal to avoid the clipping of the transmission signal 38.

Phase Shifting Example #4

Phase shifting example #4 (PS #4) corresponds to adjusting the phase characteristic of the carrier signal associated with a carrier number N by $$\frac{\pi}{3} \times (M + N),$$

mod $2\pi$, where M is the DMT symbol count. In this example, if the DMT symbol 70 clips when the DMT symbol count M equals 5, the predefined transmission signal 78 is transmitted instead of the current clipped transmission signal 38. On the following DMT symbol period, the DMT count M equals 6, thereby causing a different set of time domain samples to be generated for the subsequent DMT symbol 70', although the QAM symbols 58 used to produce both DMT symbols 70, 70' are the same.

If this different set of time domain samples (and consequently the transmission signal 38) is not clipped, the DMT transmitter 22 sends the transmission signal 38. If one of the time domain samples in the different set of time domain samples 70 (and consequently the transmission signal 38) is clipped, then the DMT transmitter 22 sends the predefined transmission signal 78 again. The process continues until a DMT symbol 70 is produced without a time domain sample 70 that is clipped. In one embodiment, the transmitter 22 stops attempting to produce a non-clipped DMT symbol 70' for the particular set of QAM symbols 58 after generating a predetermined number of clipped DMT symbols 70'. At that moment, the transmitter 22 can transmit the most recently produced clipped DMT symbol 70' or the predetermined transmission signal 78.

The PAR of the DSL communication system 2 is reduced because the predefined transmission signal 78 is sent instead of the transmission signal 38 when the DMT symbol 70 clips. For example, a DMT communication system 2 that normally has a clipping probability of 10-7 for the time domain transmission signal 38 can therefore operate with a 10-5 probability of clipping and a lower PAR equal to 12.8 dB (as compared to 14.5 dB). When operating at a 10-5 probability of clipping, assuming a DMT symbol 70 has 512 time-domain samples 70, the DMT transmitter 22 experiences one clipped DMT symbol 70 out of every $$\frac{10^5}{512},$$

or 195 DMT symbols 70. This results in the predefined (non-data carrying) transmission signal 78 being transmitted, on average, once every 195 DMT symbols. Although increasing the probability of clipping to $10^{-5}$ results in approximately a 0.5% ($^1/_{195}$) decrease in throughput, the PAR of the transmission signal 38 is reduced by 1.7 dB, which reduces transmitter complexity in the form of power consumption and component linearity.

While the invention has been shown and described with reference to specific preferred embodiments, it should be understood by those skilled in the art that various changes in form and detail may be made therein without departing from the spirit and scope of the invention as defined by the following claims. For example, although the specification uses DSL to describe the invention, it is to be understood that various form of DSL can be used, e.g., ADSL, VDSL, SDSL, HDSL, HDSL2, or SHDSL. It is also to be understood that the principles of the invention apply to various types of applications transported over DSL systems (e.g., telecommuting, video conferencing, high speed Internet access, video-on demand).

What is claimed:

1. In a multicarrier modulation system including a first transceiver in communication with a second transceiver using a transmission signal having a plurality of carrier signals for modulating a plurality of data bits, each carrier signal having a phase characteristic associated with at least one bit of the plurality of data bits, a method for scrambling the phase characteristics of the carrier signals comprising:

transmitting the plurality of data bits from the first transceiver to the second transceiver;

associating a carrier signal with a value determined independently of any bit of the plurality of data bits carried by the carrier signal, the value associated with the carrier signal determined by a pseudo-random number generator;

determining a phase shift for the carrier signal at least based on the value associated with the carrier signal;

modulating at least one bit of the plurality of data bits on the carrier signal;

modulating the at least one bit on a second carrier signal of the plurality of carrier signals.

2. The method of claim 1, wherein one or more of the first transceiver and second transceiver are cable transceivers.

3. The method of claim 1, wherein one or more of the first transceiver and second transceiver are VDSL transceivers.

4. The method of claim 1, wherein the first and second transceivers are multicarrier DSL transceivers.

5. The method of claim 1, wherein the first and second transceivers are used for high speed interne access.

6. The method of claim 1, further comprising, independently deriving the values associated with each carrier using a second pseudo-random number generator in the second transceiver.

7. The method of claim 6, further comprising using in the first and second transceivers a same seed for the first and second pseudo-random number generators and the value of the seed is transmitted from the first transceiver to the second transceiver.

8. The method of claim 6, wherein the first and second transceivers are wireless transceivers.

9. The method of claim 6, wherein the first and second transceivers are cable transceivers.

10. The method of claim 6, wherein the first and second transceivers are DSL transceivers connected using a pair of twisted wires of a telephone subscriber system.

11. The method of claim 10, wherein the first and second transceivers are VDSL transceivers.

12. The method of claim 6, wherein the first and second transceivers are multicarrier DSL transceivers.

13. The method of claim 6, wherein the first and second transceivers are also used for transport high speed internet access.

14. The method of claim 1, wherein the first and the second transceivers include digital signal processors.

15. A multicarrier modulation system including a first transceiver in communication with a second transceiver using a transmission signal having a plurality of carrier signals for modulating a plurality of data bits, each carrier signal having a phase characteristic associated with the input bit stream, the first transceiver capable of transmitting to the second transceiver the plurality of bits and operable to:

associate a carrier signal with a value determined independently of any bit of the plurality of data bits carried by the carrier signal, the value associated with the carrier signal determined by a pseudo-random number generator;

determine a phase shift for the carrier signal at least based on the value associated with the carrier signal;

modulate at least one bit of the plurality of data bits on the carrier signal; and modulate the at least one bit on a second carrier signal of the plurality of carrier signals.

16. The system of claim 15, wherein one or more of the first transceiver and second transceiver are cable transceivers.

17. The system of claim 15, wherein one or more of the first transceiver and second transceiver are VDSL transceivers.

18. The system of claim 15, wherein the first and second transceivers are multicarrier DSL transceivers.

19. The system of claim 15, wherein the first and second transceivers are used for high speed internet access.

20. The system of claim 15, wherein the first transceiver independently derives the values associated with each carrier using a second pseudo-random number generator in the first transceiver.

21. The system of claim 20, using in the first and second transceivers a same seed for the first and second pseudo-random number generators and the value of the seed is transmitted from the first transceiver to the second transceiver.

22. The system of claim 20, wherein the first and second transceivers are wireless transceivers.

23. The system of claim 20, wherein the first and second transceivers are cable transceivers.

24. The system of claim 20, wherein the first and second transceivers are DSL transceivers connected using a pair of twisted wires of a telephone subscriber system.

25. The system of claim 24, wherein the first and second transceivers are VDSL transceivers.

26. The system of claim 20, wherein the first and second transceivers are multicarrier DSL transceivers.

27. The system of claim 20, wherein the first and second transceivers are also used for high speed internet access.

28. The method of claim 15, wherein the first and second transceivers each include digital signal processors.

29. The method of claim 1, wherein the video is video-on demand.

30. The method of claim 15, wherein the video is video-on demand.

* * * * *

UNITED STATES PATENT AND TRADEMARK OFFICE
CERTIFICATE OF CORRECTION

| | | |
|---|---|---|
| PATENT NO. | : 8,718,158 B2 | |
| APPLICATION NO. | : 13/303417 | |
| DATED | : May 6, 2014 | |
| INVENTOR(S) | : Marcos C. Tzannes | |

It is certified that error appears in the above-identified patent and that said Letters Patent is hereby corrected as shown below:

In the Claims

Column 11, Claim 1, line 9, following "signal;" insert -- and --

Column 11, Claim 5, line 19, delete "Interne" and insert -- Internet --

Signed and Sealed this
Sixteenth Day of September, 2014

Michelle K. Lee
*Deputy Director of the United States Patent and Trademark Office*

UNITED STATES PATENT AND TRADEMARK OFFICE
CERTIFICATE OF CORRECTION

| | |
|---|---|
| PATENT NO. | : 8,718,158 B2 |
| APPLICATION NO. | : 13/303417 |
| DATED | : May 6, 2014 |
| INVENTOR(S) | : Marcos C. Tzannes |

It is certified that error appears in the above-identified patent and that said Letters Patent is hereby corrected as shown below:

In the Claims

At Column 11, Claim 15, line 49, delete "the input bit stream," and insert -- at least one bit of the plurality of data bits, --

Signed and Sealed this
Twenty-eighth Day of April, 2015

Michelle K. Lee
*Director of the United States Patent and Trademark Office*